US012596525B2

(12) United States Patent
Francisco

(10) Patent No.: US 12,596,525 B2
(45) Date of Patent: Apr. 7, 2026

(54) METHOD TO DETERMINE INTENDED DIRECTION OF A VOCAL COMMAND AND TARGET FOR VOCAL INTERACTION

(71) Applicant: Comcast Cable Communications, LLC, Philadelphia, PA (US)

(72) Inventor: Mark David Francisco, Clarksburg, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 114 days.

(21) Appl. No.: 18/534,033

(22) Filed: Dec. 8, 2023

(65) Prior Publication Data

US 2024/0103805 A1 Mar. 28, 2024

Related U.S. Application Data

(63) Continuation of application No. 18/054,221, filed on Nov. 10, 2022, now Pat. No. 11,853,651, which is a continuation of application No. 17/247,913, filed on Dec. 30, 2020, now Pat. No. 11,526,327, which is a continuation of application No. 16/667,457, filed on Oct. 29, 2019, now Pat. No. 10,908,875, which is a continuation of application No. 15/956,188, filed on Apr. 18, 2018, now Pat. No. 10,496,366.

(51) Int. Cl.
| | |
|---|---|
| *G06F 3/16* | (2006.01) |
| *G02B 27/01* | (2006.01) |
| *G06T 19/00* | (2011.01) |
| *H04R 1/40* | (2006.01) |

(52) U.S. Cl.
CPC .......... *G06F 3/167* (2013.01); *G02B 27/017* (2013.01); *H04R 1/406* (2013.01); *G06T 19/006* (2013.01)

(58) Field of Classification Search
CPC .......... G06F 3/167; G06F 3/011; G06F 3/012; G02B 27/017; G06T 19/006; H04R 1/406
See application file for complete search history.

(56) References Cited

U.S. PATENT DOCUMENTS

| | | | |
|---|---|---|---|
| 8,855,423 | B2 | 10/2014 | Boncyk et al. |
| 8,963,916 | B2 | 2/2015 | Reitan |
| 9,274,595 | B2 | 3/2016 | Reitan |

(Continued)

OTHER PUBLICATIONS

US Patent Application filed Nov. 10, 2022, entitled "Method to Determine Intended Direction of a Vocal Command and Target for Vocal Interaction", U.S. Appl. No. 18/054,221.

(Continued)

*Primary Examiner* — Yogeshkumar Patel
(74) *Attorney, Agent, or Firm* — BakerHostetler

(57) ABSTRACT

Systems and methods are described for recognizing and responding to commands in a virtual or physical environment. A system may receive voice data and determine an intended command. The system may then determine a position and viewpoint orientation of the user to be able to determine one or more digital assets associated with the user. The system may then determine a current state associated with each digital asset of the one or more digital assets to be able to determine at least one digital asset that is configured to process the command. The system can then apply the command to at least a first digital asset of the at least one digital asset that is configured to process the command.

36 Claims, 10 Drawing Sheets

(56) References Cited

U.S. PATENT DOCUMENTS

| | | | |
|---|---|---|---|
| 9,493,169 B2 | 11/2016 | Ebner | |
| 9,503,681 B1 | 11/2016 | Popescu et al. | |
| 9,645,718 B2 | 5/2017 | Aebi | |
| 9,779,538 B2 | 10/2017 | Sanders et al. | |
| 9,942,533 B2 | 4/2018 | Sathish | |
| 9,996,945 B1 | 6/2018 | Holzer et al. | |
| 10,016,475 B2 | 7/2018 | Shon et al. | |
| 10,162,475 B2 | 12/2018 | Jackson et al. | |
| 10,194,259 B1 | 1/2019 | Martin et al. | |
| 10,213,688 B2 | 2/2019 | Gewicke et al. | |
| 10,217,185 B1 | 2/2019 | Cabanero et al. | |
| 10,242,501 B1 | 3/2019 | Pusch et al. | |
| 10,249,091 B2 | 4/2019 | Defaria et al. | |
| 10,403,050 B1 | 9/2019 | Beall et al. | |
| 10,416,757 B2 | 9/2019 | Smit | |
| 10,496,366 B2 | 12/2019 | Francisco | |
| 10,569,172 B2 | 2/2020 | Yee | |
| 10,580,218 B1 | 3/2020 | Michael | |
| 10,908,875 B2 | 2/2021 | Francisco | |
| 2016/0232131 A1* | 8/2016 | Liu | G06F 40/103 |
| 2016/0260431 A1* | 9/2016 | Newendorp | G10L 15/22 |
| 2019/0272673 A1 | 9/2019 | Mathur et al. | |
| 2020/0065062 A1 | 2/2020 | Francisco | |
| 2020/0302930 A1* | 9/2020 | Chen | H04L 12/4625 |

OTHER PUBLICATIONS

US Patent Application filed Dec. 30, 2020, entitled "Method To Determine Intended Direction Of A Vocal Command And Target For Vocal Interaction", U.S. Appl. No. 17/247,913.

* cited by examiner

Content Item 200

Environment Engine 210

Virtual Environment 220

Digital Assets 230

Receive voice data
310

Determine voice data is a command
320

Determine position and viewpoint orientation
of the user
330

Determine digital asset(s) in user's field of view
340

Apply command to digital asset(s)
350

Virtual Environment 300

Receive voice data
510

Determine voice data is a command
520

Determine assets capable of handling the
command
530

Output sensory pattern to each asset capable of
command
540

Receive sensory pattern and determine asset to
command
550

Apply command to asset
560

METHOD TO DETERMINE INTENDED DIRECTION OF A VOCAL COMMAND AND TARGET FOR VOCAL INTERACTION

CROSS-REFERENCE TO RELATED APPLICATIONS

This application is a continuation of U.S. patent application Ser. No. 18/054,221, filed Nov. 10, 2022, now U.S. Pat. No. 11,853,651 issued Dec. 26, 2023, which is a continuation of U.S. patent application Ser. No. 17/247,913 filed Dec. 30, 2020, now U.S. Pat. No. 11,526,327 issued Dec. 13, 2022, which is a continuation of U.S. patent application Ser. No. 16/667,457 filed Oct. 29, 2019, now U.S. Pat. No. 10,908,875 issued Feb. 2, 2021, which is a continuation of U.S. patent application Ser. No. 15/956,188 filed Apr. 18, 2018, now U.S. Pat. No. 10,496,366 issued Dec. 3, 2019, each of which are hereby incorporated by reference in their entirety.

BACKGROUND

Virtual reality (VR) and augmented reality (AR) enable an immersive form of human-computer interaction where a user may experience a virtual environment and/or one or more virtual objects may interact with the surroundings of the user in the physical environment. Both VR and AR allow a user to experience more avenues of entertainment than a traditional viewing screen, and content providers may develop media that takes advantage of the experiences VR and AR provide.

Virtual reality and augmented reality environments allow a user the freedom to explore a virtual environment or enhanced physical environment. Because of such freedom, vocal commands issued by a user may be difficult for a system to comprehend. For example, a vocal command may be captured by a microphone connected to a system that is not aware of the direction in which the user is facing. In such a case, a system executing the virtual environment or enhanced physical environment may not be able to determine which asset(s) the user is attempting to command. Further, an environment may contain multiple assets that may be subject to vocal commands, but the system executing the environment may not be able to determine to which digital asset the user is issuing the command A user not able to interact properly with digital assets in a virtual or enhanced environment may have a poor experience.

Systems may deploy multiple microphones throughout a room to attempt to determine which asset a user is attempting to command. However, such a deployment may be expensive and impractical for home and/or mobile implementations. For example, each time a user wishes to experience the environment, the user may need to transport and setup various microphones, which is undesirable. Other systems may label assets with an identifier, such as a QR code, to determine assets available to command and their associated capabilities. However, such labeling is labor-intensive and impractical. Similarly, other systems may utilize image recognition to identify available assets in the environment. However, implementing a database comprising shapes and sizes of every possible digital asset available for purchase is likewise impractical and may vary from environment to environment.

SUMMARY

Systems and methods are described for recognizing and responding to vocal commands to command an asset in a virtual or physical environment. In a virtual environment, a system may receive voice data from a user and determine the voice data is a command. The system may then determine a position and viewpoint orientation of the user to be able to determine one or more digital assets in a field of view of the user. The system may then apply the command to at least a first digital asset of these digital assets. In a physical environment, a system may receive voice data from a user and determine the voice data is a command. The system may then determine one or more devices in the environment that the command may be applied to and output a unique sensory pattern to each device such that the sensory pattern may be used to distinguish one device from another device. A sensory pattern may be a visual, auditory, or other type of pattern that may be recognized by a device such as a virtual reality or augmented reality headset. The system, via a headset or other suitable means, may receive one of these output sensory patterns and determine the sensory pattern is unique to a first device of the one or more devices, indicating the first device is the device the user wishes to command. The system may then apply the command to the first device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION

Figure 1A:
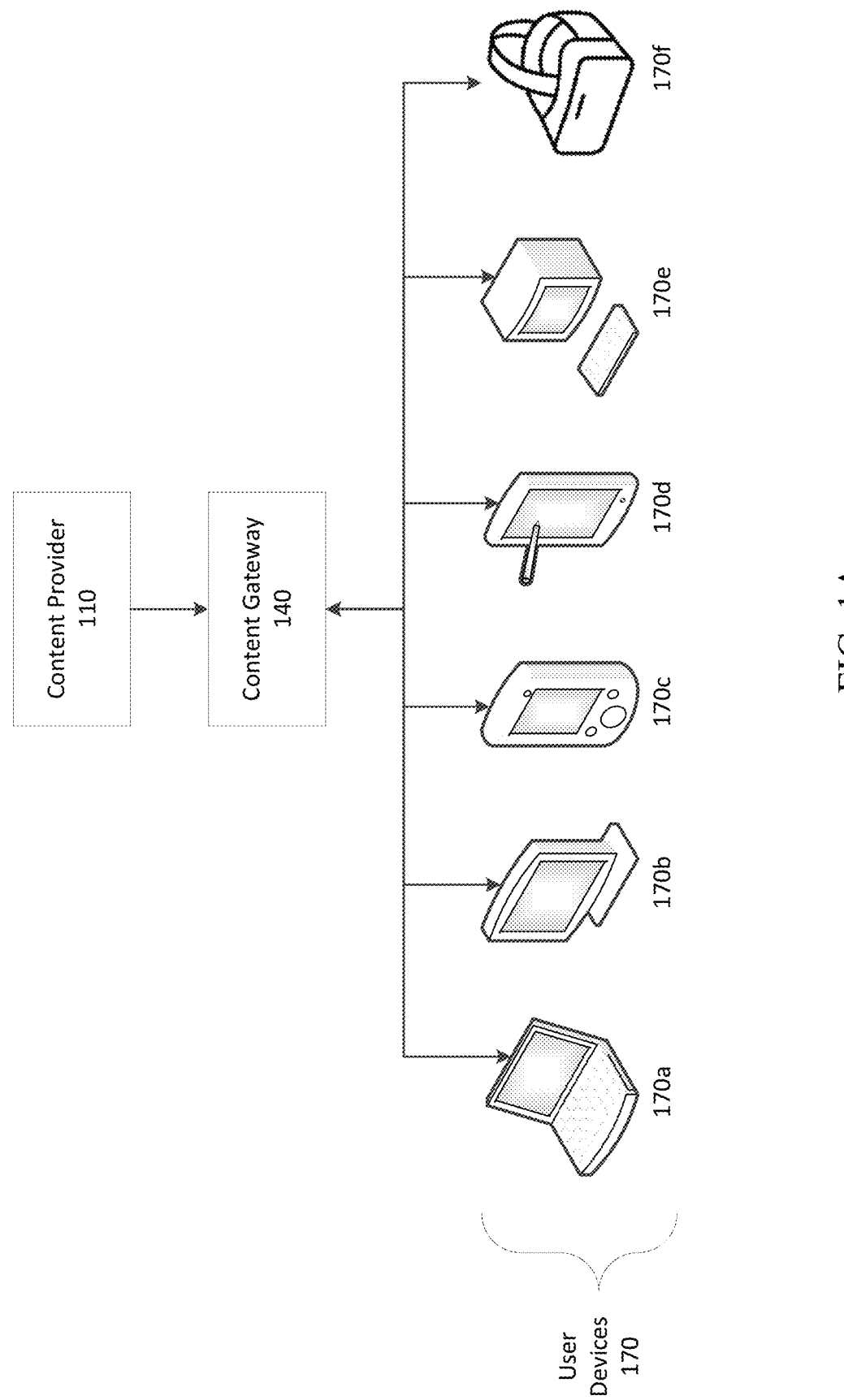
FIG. 1A depicts an example system.

Myriad electronic content is consumed on a daily basis. Articles, blogs, and documents are read; television shows and movies are watched; books are both read and heard; video games are played; software is executed. Much of consumed content is consumed via smartphones, laptops, desktops, tablets, game consoles, and other computer systems, typically involving use of the Internet or other computer network.

For a user to interact with content on a computer system, the content should have an associated user interface. A user interface may allow a user to interact with the content in some way, typically by inputting a command. For example, a user interface for a video streaming service may allow a user to search and navigate a library of videos and then select a video of his or her choosing to watch. Then, during playback, the user may or may not be able to perform various actions such as pause, play, rewind, and fast-forward. Generally, a user interface on a computer system may use any viable method of input compatible with the system, such as pushing buttons on a remote control or game controller, voice commands, touch gestures, body gestures, keyboard or mouse commands, or any other method of human-computer interaction that allows a user to access or manipulate data on the computer system.

Virtual reality (VR) leverages three-dimensional (3D) environments to immerse a user in a virtual environment. A 3D virtual computer environment may be created, and users may typically don specialized computer eyewear to immerse themselves in the environment. Once immersed in the environment, a user may look around as if he is physically inside it. For example, the user may typically look 360 degrees in every direction to view the environment. In some cases, the user may also walk around the environment by walking in physical reality, which may or may not take place on a treadmill or other contained apparatus a user may move in or on.

Augmented reality (AR) is similar in concept to virtual reality in that it may involve digital assets and/or a virtual environment projected to a user's visual field; however, these digital assets and/or virtual environment may be projected into the user's current real physical environment. For example, a user may hold up his mobile phone camera view and see a 3D virtual object added to the screen image, such as a rendering of a completed building at a construction site. In another example, a user may wear specialized computer eyewear that adds virtual projections to the physical environment, such as a news channel being broadcast on a wall as if a television was present, or video game characters on a user's coffee table that the user may manipulate.

User interfaces for VR and AR may typically allow interactions via body gestures, voice commands, and button commands, which may be available via controllers, microphones, environmental sensors, or any other viable input apparatuses. For example, a user may physically move his head in a specific direction to view a digital asset or scroll through a list of digital assets; a similar action may be performed by one or more joysticks or directional-pads on a controller or headset. To select such a digital asset, a user may speak "select" or another command that indicates to the computer system that the user would like to select the asset, or the user may press a button on a remote control, the VR or AR headset, or other controller to select a desired object.

A digital asset may be selectable by a user and/or may respond to user commands. For example, a lamp may power on and off in response to vocal commands. In another example, a television may change channels in response to vocal commands Various digital assets may be available for vocal commands in a virtual environment or enhanced physical environment. Similarly, various assets in a physical environment, such as smart devices, may be amenable to vocal commands Recognizing the correct asset(s) to command in response to a vocal command is important for providing a seamless experience for a user.

Systems may deploy multiple microphones throughout a room to attempt to determine which asset a user is attempting to command. However, such a deployment may be expensive and impractical for home and/or mobile implementations. For example, each time a user wishes to experience the environment, the user may need to transport and setup various microphones, which is undesirable. Other systems may label assets with an identifier, such a QR code, to determine assets available to command and their associated capabilities. However, such labeling is labor-intensive and impractical. Similarly, other systems may utilize image recognition to identify available assets in the environment. However, implementing a database comprising shapes and sizes of every possible digital asset available for purchase is likewise impractical and may vary from environment to environment.

Systems and methods are described for recognizing and responding to vocal commands to command an asset in a virtual or physical environment. In a virtual environment, a system may receive voice data, such as any type of an utterance, from a user and determine the utterance is a command. The system may then determine a position and viewpoint orientation of the user to be able to determine one or more digital assets in a field of view of the user. The system may then apply the command to at least a first digital asset of these digital assets. The term "apply the command," as used herein, is meant to encompass sending a message to the device to command it accordingly, performing some operation that effects the desired action on the device, or any other mechanism, such as delegating implementation or forwarding of the command to an intermediate device, that results in the desired action. In a physical environment, a system may receive an utterance from a user and determine the utterance is a command. The system may then determine one or more devices in the environment that the command may be applied to and output a unique sensory pattern to each device such that the sensory pattern may be used to distinguish one device from another device. A sensory pattern may be a visual, auditory, or other type of pattern that may be recognized by a device such as a virtual reality or augmented reality headset. For example, a sensory pattern may be a series of light blinks emanating from a lamp. Another sensory pattern may be a specific tone or a series of tones emanating from a speaker. Yet another sensory pattern may be an image displayed on a television. The system, via a headset or other suitable means, may receive one of these output sensory patterns and determine the sensory pattern is unique to a first device of the one or more devices, indicating the first device is the device the user wishes to command. The system may then apply the command to the first device.

FIG. 1A illustrates an example of a system for use with embodiments described herein. The example entities of FIG. 1A may be part of or use a computer network, which may be a small, home network or part of a large network such as the Internet, or a combination of both. Additionally, the entities of FIG. 1A may be part of a single computer system.

The content provider 110 may be used by a provider of consumable content, such as a media company or other source of content that may be experienced via a VR interface or an AR interface. For example, the content provider 110 may be used by a TV or movie studio, a video game company, a software developer, or even a single user. The content provider 110 may be communicatively connected to a content gateway 140, as shown in FIG. 1A. The content provider 110 may transmit media content to the content gateway 140. Media content may be entities the user of the content provider 110 wishes to allow users to experience. For example, a media content item may be a video game, a movie, a TV show, or any other content a user may experience via a VR interface or an AR interface.

The content gateway 140 may be a user-facing provider of media services, such as software used by a cable company or streaming service, which may aggregate content from several sources, such as multiple content providers, into a single source point for a customer. The content gateway 140 may deliver content via a set top box, the Internet, a local hard drive, or any other viable method of delivering content to a user. As shown in FIG. 1A, a user may access content via a laptop 170a, a television 170b, a smartphone 170c, a tablet 170d, a desktop 170e, a headset 170f, or any other device capable of presenting content to a user. Any of the user devices 170 may comprise one or more microphones for vocal interaction with the system. The content gateway 140 may present VR or AR user interfaces to enable users to experience the content to which the content gateway 140 provides.

The content provider 110 and the content gateway 140 may be physical or digital and take any suitable form for their described purposes. For example, they may take the form of software components on one or more computers or modules within a single software suite. Communicative connections between the components may be physical connections, such as those via hardware circuits or LAN cables, wireless connections, such as those via WiFi or cellular, or any other suitable communicative connection. In an example, the content provider 110 may be used by a media company that creates virtual environments, such as a virtual environment that corresponds to an atmosphere seen in a movie. The content provider 110 may send that virtual environment to a content gateway 140. For example, the virtual environment may be sent via a file transfer protocol, and the communicative connection between the content provider 110 and the content gateway 140 may be an Internet connection. The content gateway 140 may receive the virtual environment and may store the virtual environment for display to users accessing the content gateway 140 and attempting to experience the atmosphere of the movie.

In another example, the content provider 110 and the content gateway 140 may be software programs or software modules on a single computer. A user of this computer may create content with or open content with the content provider 110. Such content may be a home movie, a video game, or other content that may be experienced via a VR interface or an AR interface. The user may use the content provider 110 to create digital assets for use in the interface, the interface itself, or both. In this example, communicative connections may be one or more hardware circuits on the computer, such as a bus. The user may then experience the content from the computer or other device capable of accessing the content.

Figure 1B:
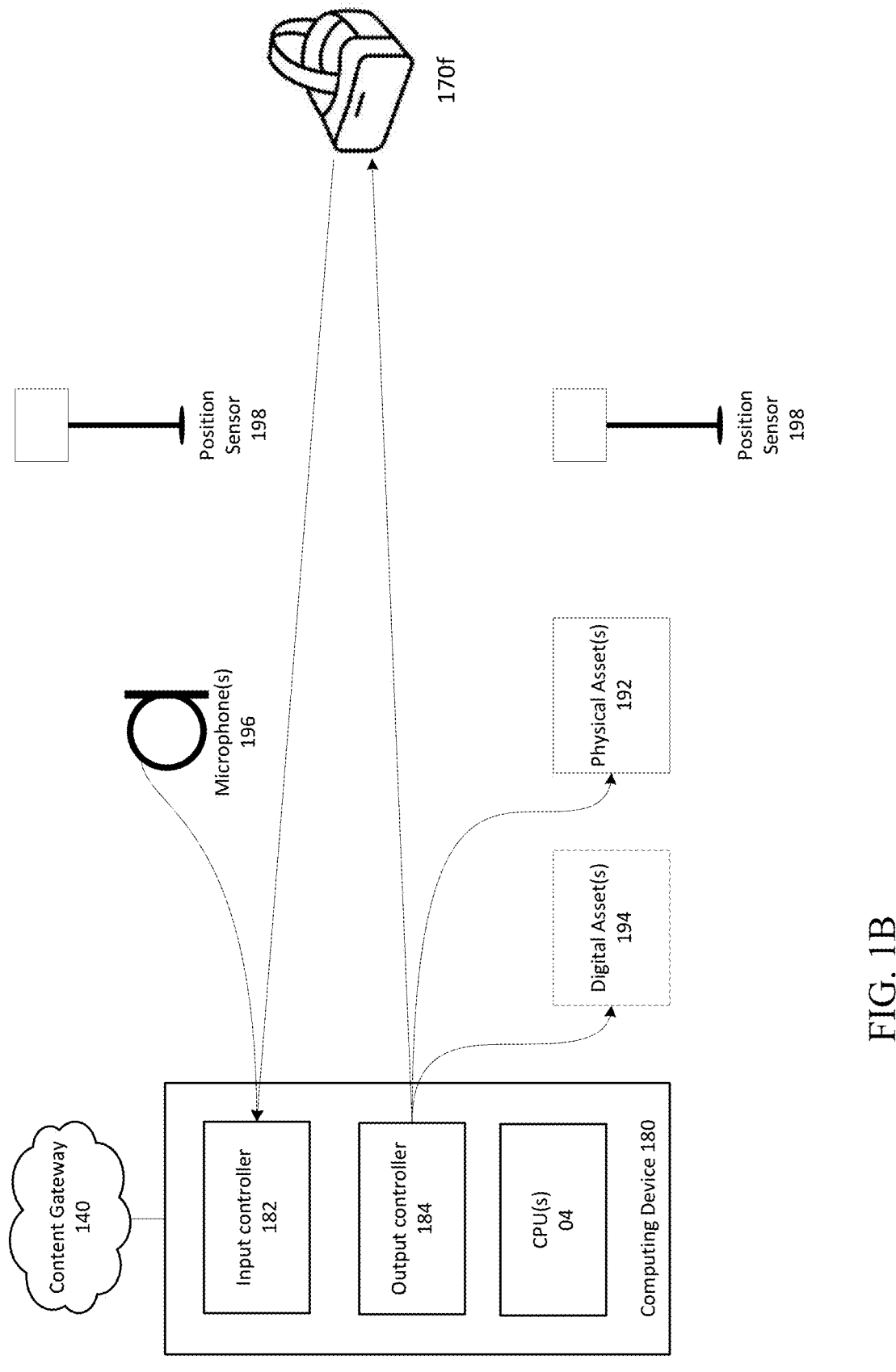
FIG. 1B depicts an example system.

FIG. 1B shows an example of a system for use with a VR or AR headset, such as the headset 170f. A VR or AR headset may use more components than just the headset 170f shown in FIG. 1A. Such components may comprise a computing device 180, one or more physical assets 192, one or more digital assets 194, one or more microphones 196, and one or more position sensors 198.

The headset 170f may be communicatively connected to the computing device 180. The computing device 180 may provide a connection between the headset 170f and the content gateway 140 to provide the headset 170f with access to content. The computing device 180 may comprise one or more CPU(s) 04 and/or GPU(s), such as those described below with regard to FIG. 7. The computing device 180 may also comprise an input controller 182 and an output controller 184.

The input controller 182 may receive input, and the output controller 184 may send output. The input controller 182 may receive input from one or more sources of the system so that the computing device 180 may perform processing on the input. The output controller 184 may send output to system components, such as the headset 170f, the physical assets 192, and other connected system components. The input controller 182 and the output controller 184 may be a combined entity, such as the input/output controller 32 of FIG. 7, below, or separate entities, as shown in FIG. 1B. The input controller 182 and the output controller 184 may also be linked to the CPU(s) 04 and/or GPU(s) for processing. The input controller 182 may send input data to the CPU(s) 04, which may be used to influence a user's physical or virtual environment. The CPU(s) 04 may process data that may be output to the user, in the form of a change in digital asset(s) 194, physical asset(s) 192, the headset 170f, or any combination thereof.

The one or more microphones 196 may comprise any sensor capable of detecting and/or receiving sound. The microphones 196 may be separate from the headset 170f. For example, one or more microphones may be available in the user's physical surroundings, such as an external microphone, as part of a smart home hub, in one or more IoT devices, in one or more smartphones, or other such stationary microphones. The microphones 196 may also be integrated into the headset 170f. The microphones 196 may detect a user's voice, such as in the case of an utterance and vocal command, or other sound data. The microphones 196 may send data regarding the detected voice or sound to the input controller 182. The computing device 180 may process such data in accordance with the processes described herein, which may affect a virtual or physical environment a user is experiencing.

The headset 170f may send data generated from a camera of the headset 170f to the input controller 182. The headset 170f may send position and viewpoint orientation data to the input controller 182. A user's position and viewpoint orientation may determine what the user may view in a virtual or physical environment. Viewpoint orientation may comprise a direction and field of view (i.e., which direction the user is looking and what the user sees in her field of view). Viewpoint orientation may be expressed either as a three-dimensional vector of Euler rotation angles or as a four-dimensional quaternion more suitable for composition, interpolation and other mathematical treatment. The position of a user may be expressed as a three-dimensional vector, for example as x, y, and z coordinates. Viewpoint orientation in combination with position of a user may be referred to as the user's "pose" within a virtual or physical environment. Viewpoint orientation may be determined by a user device via existing methods. For example, information provided by sensors on a VR or AR headset may be used to determine a user's viewpoint orientation, and together with the user's position, the pose of the user. Based on the viewpoint orientation and position, i.e., pose, of the user, a field of view of the user in the virtual environment may be determined— that is, what the user sees in the virtual environment from his current position. Such a position and viewpoint orientation may be determined in part by the one or more position sensors 198.

The position sensors 198 may comprise any sensor capable of determining a position and/or viewpoint orientation of a user wearing the headset 170f and may be separate from the headset 170f or integrated into the headset 170f. For example, the position sensors 198 may emit light, and light sensors on the headset 170f may detect a position and/or direction of the light(s). Such detected light may be sent to the input controller 182 so that the computing device 180 may determine the position and viewpoint orientation.

Such calculations may be performed locally on the headset 170*f* and may then be sent to the input controller 182.

The one or more physical assets 192 may comprise devices or other interactive objects in a user's physical environment. The physical assets 192 may be communicatively connected to one another and/or to other system components. Such connections may allow the physical assets 192 to be controlled and/or manipulated by other components of the system. Examples of physical assets 192 may include lamps, TVs, monitors, speakers, and other interactive devices or objects. The computing device 180 may use the output controller 184, or other similar component, to control the physical assets 192. The computing device 180 may turn on, turn off, configure, change a setting of, or otherwise manipulate the physical assets 192.

The one or more digital assets 194 may comprise objects in a virtual environment and/or virtual objects projected into a physical environment. The digital assets 194 may be viewed through use of the headset 170*f* or other such device capable of displaying virtual objects to a user. The digital assets 194 are virtual and so may be manipulated by the computing device 180. The digital assets 194 are further described with regard to FIG. 2, below.

Media content may be 2D or 3D and may have the ability to adapt dimensions dynamically to a user device accessing the interface. For example, an environment may be created for use in a 3D VR setting, but may be viewed as a 2D environment from a smartphone, TV, or computer. Any digital assets a content gateway receives may be interactive and may allow the user to select or manipulate them in an associated VR or AR environment or setting. For example, a user may select an image to begin playback of a movie on a wall or select a 3D model to view and/or manipulate.

Figure 2:
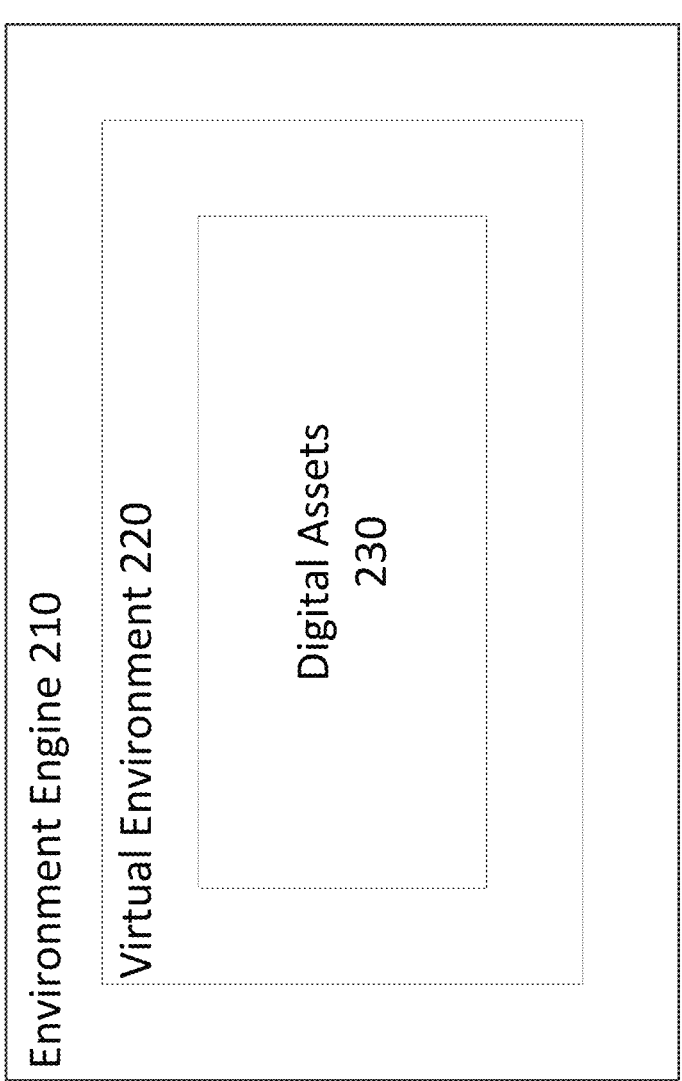
FIG. 2 illustrates an example content item.

Media content items designed for VR or AR environments may comprise one or more logical entities, which may or may not be situated in a hierarchy. FIG. 2 illustrates an example of a content item 200 comprising an environment engine 210, a virtual environment 220, and digital assets 230.

As shown in FIG. 2, the digital assets 230 may be entities of the virtual environment 220. The virtual environment 220 may be an entity of the environment engine 210. In example embodiments, the environment engine 210 may comprise a set of rules and/or a set of attributes that entities, such as virtual environments and associated sub-entities, of the environment engine 210 may use. The environment engine 210 may define user input operations and rules of physics that apply to objects and interactions in virtual environments 220 that use the environment engine 210. Such an associated virtual environment 220 may then use the defined user input operations and rules of physics to determine how interactions between the user and digital assets 230 are performed and/or executed in the virtual environment 220 and how interactions between and among objects are performed and/or executed in the virtual environment 220. The virtual environment 220 may comprise any number of digital assets or media content items for a user to experience and/or interact with.

As shown in FIG. 2, the virtual environment 220 may comprise digital assets 230, such as the digital assets 194 of FIG. 1B. A digital asset 230 may be any content item that a user may experience and/or interact with. For example, the digital assets 230 may comprise images or textures that create a virtual physical environment, such as an image of mountains in the distance that a user may view, a sand texture acting as the ground of the virtual physical environment, walls of a building, ambient effects, and other such environmental assets. Example digital assets 230 providing ambient effects in a virtual environment 220 may comprise fog, fire, weather, etc. Additionally, the digital assets 230 may comprise virtual objects or characters a user may interact with, such as a virtual character a user may move with input commands, an object a user may push or throw, virtual tools, and other interactive objects. Rules defined by the environment engine 210 may dictate how interactions with and among the digital assets 230 may occur.

The virtual environment 220 may comprise a grid, matrix, or other data structure representing position data, such as (x, y, z) coordinates. This position data may be used to define where the digital assets 230 may be viewed relative to one another and may be of any feasible relative measurement. For example, a hammer may be at coordinate (1, 1, 1), and a nail may be at coordinate (2, 2, 1), where each (x, y, z) corresponds to one-foot by one-foot by one-foot cubes in the virtual environment 220. Coordinates of the virtual environment 220 may comprise empty space. For example, coordinates may represent air or other empty region for a user to move about the environment without colliding with another digital asset, e.g., a user may move in coordinates between a ground digital asset and a sky digital asset to mimic walking on the ground in reality. A user may also be able to save locations of interest in the virtual environment 220 based on such position data. For example, the user may wish to save the position of the hammer, and the system executing the virtual environment may store the associated position (1, 1, 1) for later use by the user. Stored positions and/or points of interests may be stored in computer memory and may act as a digital asset in a virtual environment 220. Such points of interest may be used to store digital assets that may be commanded, direct a camera through the virtual environment, or perform any other feasible interaction in the virtual environment.

Figure 3A:
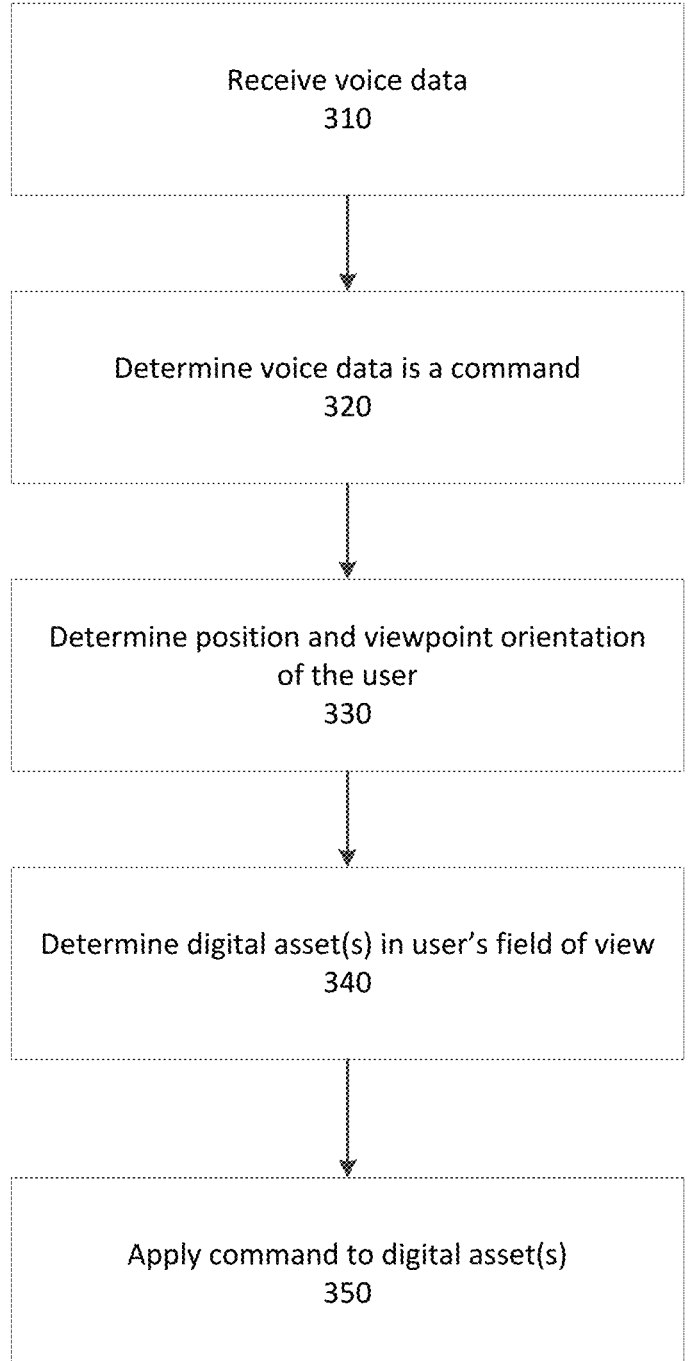
FIG. 3A is a flow diagram depicting an example process for recognizing and responding to vocal commands in a virtual environment.

FIG. 3A is a flow diagram depicting an example process for recognizing and responding to vocal commands in a virtual environment, such as the virtual environment 220.

At block 310, an utterance or other voice data may be received. When one or more microphones, such as the microphones 196 of FIG. 1B, detect an utterance from the user, the microphones may capture the utterance and send the utterance to a system, such as that of any or all of the devices of FIGS. 1A-B, to process the utterance. For a microphone without additional software, the microphone may send captured utterances to the system for processing. For example, the microphone may send captured sound data to an input controller, as shown in FIG. 1B. Alternatively or additionally, a microphone may comprise processing software that is able to distinguish commands from other user utterances. The system may also determine a direction of the utterance using the one or more microphones. Direction of the utterance may be determined by the use of an audio surface map. A microphone or array of microphones may use sonar to create an audio surface map of a room. A direction of the utterance may then be determined based on a path the utterance traveled around the room, e.g., what wall(s) had the most powerful audio reflection. A microphone array on a physical object may provide better direction-finding ability than a single microphone. Similarly, a distributed mesh of microphones may be used to determine direction if multiple microphones are scattered throughout a room and/or integrated into other devices such as IoT devices.

At block 320, the utterance or other voice data may be determined to be a command. After receiving an utterance from a communicatively connected microphone, the system may determine whether the utterance is a command for a digital asset in the virtual environment using any feasible means, such as speech recognition software or other speech analysis process. For example, the system may comprise a stored dictionary of key words and/or phrases corresponding to commands in the virtual environment. In such a dictionary, the words "lights off," may correspond to lights in the virtual environment being turned off. In another example, a phrase such as "that's cool" or other similar phrase may correspond to placing a point of interest in the virtual environment. Such a point of interest may be stored in computer memory, as described above.

At block 330, a position and viewpoint orientation of the user may be determined. In order to determine an intended target for the command, the system must first determine where the user is located in the virtual environment and what direction the user is looking in the virtual environment, i.e., what the user is viewing in the virtual environment. User position may be implemented in the form of (x, y, z) coordinates or any other feasible manner Viewpoint orientation may be determined by the user device via existing methods. For example, information provided by sensors on a VR or AR headset may be used to calculate the user's viewpoint orientation. Based on the user's viewpoint orientation and position, i.e., pose, a field of view of the virtual environment may be determined—that is, what the user sees in the virtual environment given that pose.

Figure 3B:
FIG. 3B illustrates an example of a virtual environment.
Figure 3B:
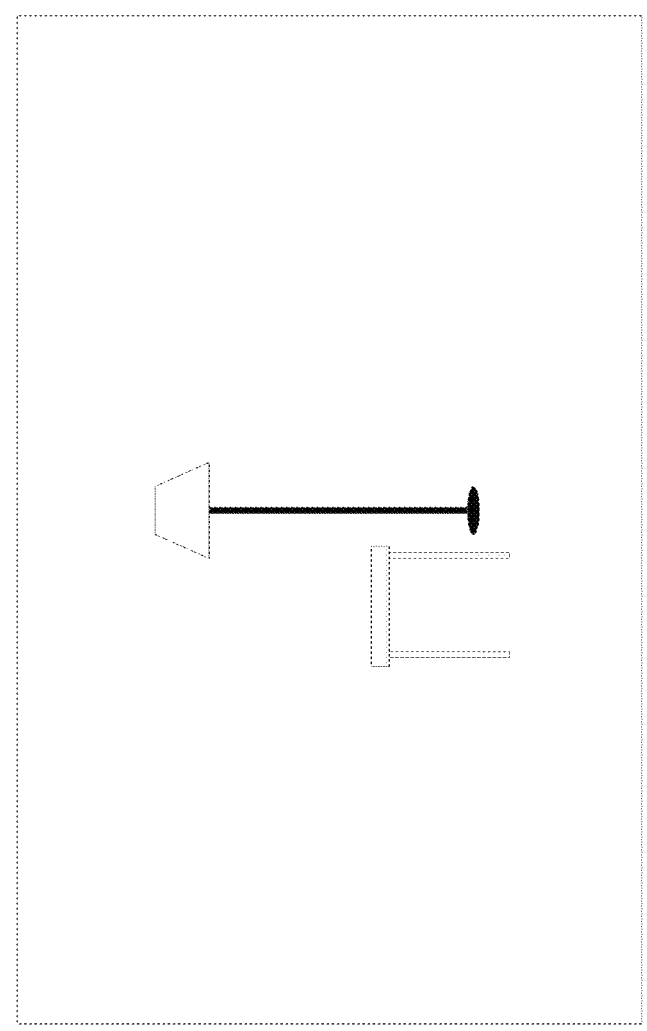

At block 340, digital asset(s) in the user's field of view may be determined. Based on the position and viewpoint orientation of the user, the system may determine one or more digital assets the user can see. The system may search the virtual environment for the one or more digital assets based on the locations of those one or more digital assets in the virtual environment. For example, if a user is standing at coordinate (1, 1) and looking in the direction of coordinate (1, 5), the system may determine which, if any, digital assets are located between coordinates (1, 1) and (1, 5) and beyond coordinate (1, 5) linearly extending outward from the user. A view of a user may continue until a perspective converges, such as at a horizon line, or until one or more digital assets block the view of the user, such as a door. The system may determine a range of coordinates to search for digital assets in the user's field of view because a user may typically see an entire section of an environment, not simply a straight line, as would be the case inside a tunnel. In an example, based on the position and viewpoint orientation of the user, a lamp and a table may be visible in a virtual environment 300, as shown in FIG. 3B. The lamp and the table are located at coordinates in the direction the user is facing, and the lamp and the table are close enough to the user that they are not obstructed nor vanish because of perspective. Digital assets labeled as points of interest may also be determined.

At block 350, the command may be applied to the digital asset(s). The system may apply the received command to one or more of the digital assets in the user's field of view. If there is a single digital asset, the system may apply the command to that digital asset. If there are a plurality of digital assets, in an example, the system may apply the command to each digital asset unless the system determines the command is appropriate to only a subset of the digital assets or is not appropriate for one or more of the plurality of digital assets. For example, in the virtual environment 300 in FIG. 3B, there is a table and a lamp. The system may apply a "turn on" command to the table and lamp. Such a command will likely not affect the table (unless the virtual environment has defined tables to have more than one state), but may turn on the lamp. Additionally, the system may recognize that the table in FIG. 3B is not going to respond to a "turn on" command. Thus, the system may apply the command to only the lamp and not the table. States associated with each digital asset may also be used to determine digital asset(s) to apply a command to. A command will likely not be applied to digital assets currently in a conflicting state. For example, if there are two lamps in the user's field of view, and only one lamp is turned on, the system may determine that a "turn off" command applies only to the turned on lamp because the second lamp is not currently turned on. Additionally, the system may use a strength and direction of the utterance combined with the position and viewpoint orientation of the user to determine the intended digital asset to command Such a determination may be more accurate than just using the position and viewpoint orientation of the user because two different sources of direction, both viewpoint orientation and audio direction, are being used. Direction of the utterance may be determined as described above at block 310. Strength of the utterance may be determined based on a volume of the utterance received at the microphone and/or other relevant factors. Because volume may change based on audio reflections off walls and other objects, strength may be calculated in part on the determined direction of the utterance. For example, if an utterance was reflected off a wall, the volume may be lower than if the utterance was received directly. The system may consider such a reflection when determining a relative strength of the utterance. Strength may also be determined based on user history. The system may store a history of utterances from a user and determine a relative volume of an utterance based on such a history. For example, if a user typically has used a relatively strong utterance to change a TV channel, the system may infer the user intends to use a strong utterance the next time an utterance to change a TV channel is received, even if the volume of the utterance was relatively low.

Figure 3C:
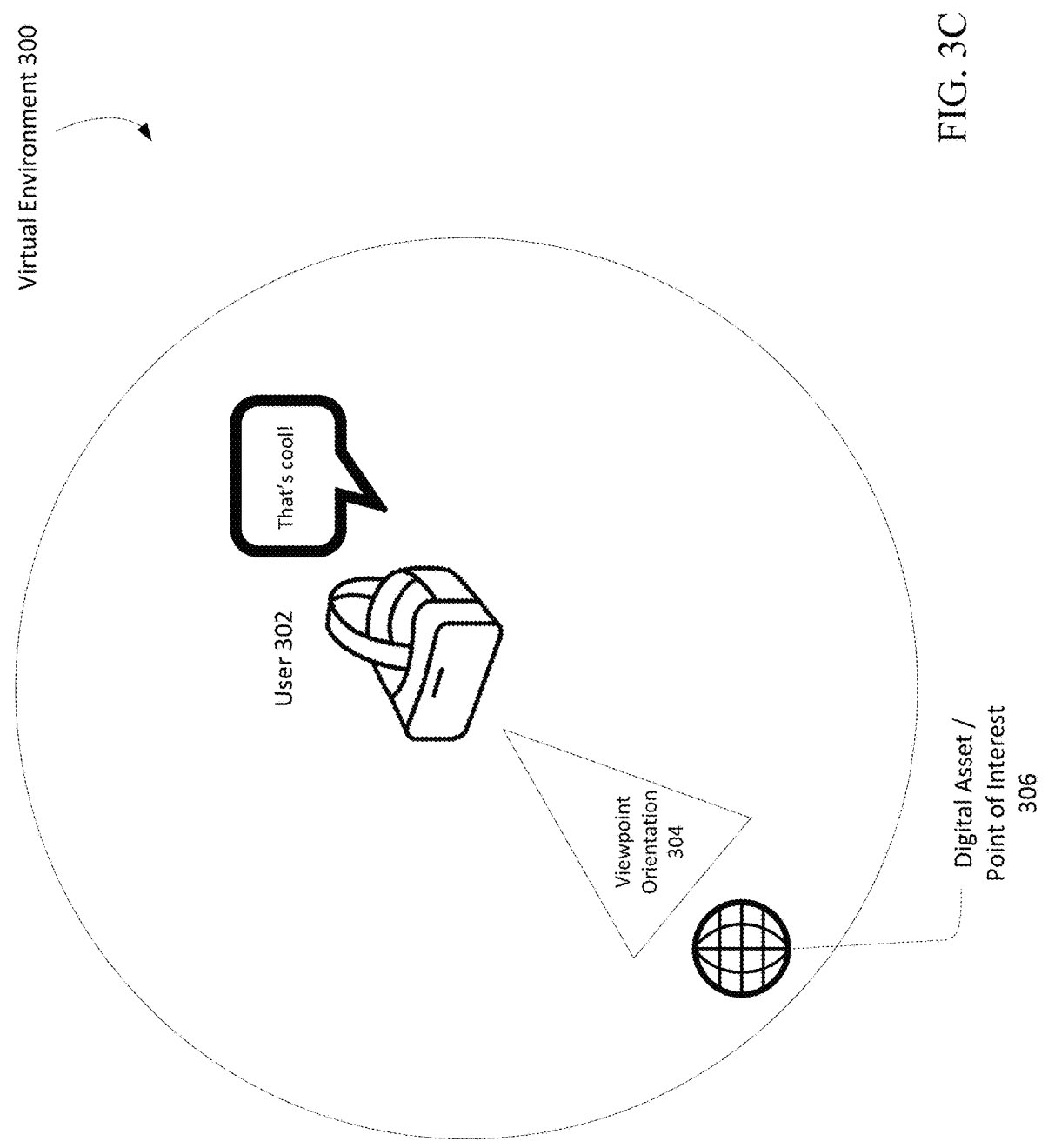
FIG. 3C illustrates an example of a user in a virtual environment.

An example embodiment using the process of FIG. 3A is shown in FIG. 3C. A user 302 may have a viewpoint orientation 304 in the virtual environment 300 and may say aloud, "That's cool!" A microphone may detect the utterance and transmit the utterance to the system executing the virtual environment 300. The system may determine "that's cool" corresponds to a command to place a point of interest in the virtual environment 300. Such a determination may be performed by a dictionary or other existing means for command recognition. The system may then determine a position and viewpoint orientation of the user 302. In this example, the viewpoint orientation 304 is the viewpoint orientation, and the position is just off-center in the virtual environment 300. The system may then determine any digital assets in the field of view of the user 302. Here, the system may determine the user 302 is looking at a digital asset 306. The system may then set the digital asset 306 as a point of interest and store such information, as described above.

Additional example embodiments may allow a system to receive a mapping of available digital assets to command. In an example embodiment, a user may traverse a virtual environment with a user device and inspect digital assets. These digital assets and their associated positions and capabilities may be identified, by the user or the system, and stored by the system. Later, when a user traverses the virtual environment, the system may determine which digital asset the user is attempting to command based on the stored digital asset data. Such information may then be used when the user traverses the environment and attempts to command the physical assets in a manner similar to that of FIG. 3A.

In other example embodiments, a similar mapping may be performed in an AR environment. A physical environment may be scanned, for example via a user device, and represented in computer memory as a virtual environment, such as a virtual environment 220. Assets, such as devices, objects, furniture, etc., in the physical environment may be represented as digital assets, which a user may then interact with. For example, a user may wear an AR headset and traverse a physical room. The AR headset may have a camera that scans the room. The scan may assist in creating a virtual environment that matches the layout of the room. Position data of such a virtual environment may then correspond to a user's position in the physical environment. Assets in the room may be scanned and represented as digital assets in the created virtual environment and may be stored by the system. The user, or system, may identify one or more of the assets as assets that may be commanded. Vocal interaction with such digital assets may then be performed in accordance with a method such as that of FIG. 3A. Additionally, because the stored virtual environment corresponds to the physical environment, interacting with such a digital asset may result in a corresponding interaction in the physical environment. For example, commanding a lamp to turn on may result in the lamp turning on in the physical environment. However, such interactions may not be feasible if the system is not able to access a stored one-to-one correspondence between position data in the virtual environment and position data in the physical environment because the system may not be able to determine which digital asset or object the user is attempting to interact with.

In a physical environment, a system may not have access to position data to determine where assets are located in relation to one another. Such a situation may make commanding assets difficult because the system may not be able to determine a user's position in relation to an asset's position. For example, assume a room has a black lamp, a white lamp, a short lamp, and a microphone in the corner of the room, as depicted in the physical environment 400 of FIG. 4. Each lamp is capable of being commanded to turn on and off, and a system to which the microphone 406 is connected, such as that shown in FIG. 1B, does not have access to a layout of the physical environment 400 to determine a position of the user 402 relative to any of the three lamps. The user 402 may issue a command to "turn on" at a viewpoint orientation 404 aimed at the short lamp. The microphone 406 may detect the command and be able to determine where the user 402 is in relation to the microphone 406 and may transmit such information to the system, for example in accordance with the process depicted in FIG. 3A. However, even assuming the user 402 is using a user device with a camera such as a headset 170*f*, the system may not be able to determine a layout of the physical environment 400 from this data alone and may not recognize that the short lamp viewed in the camera feed may be commanded. Thus, the system may incorrectly assign the command to a different lamp or all lamps, if the system assigns the command at all.

To account for lack of position data, assets (digital and/or physical) may themselves be used to determine an asset intended to be commanded by a user. Sensory output of an asset may be used to determine which asset the user intends to command.

Figure 4:
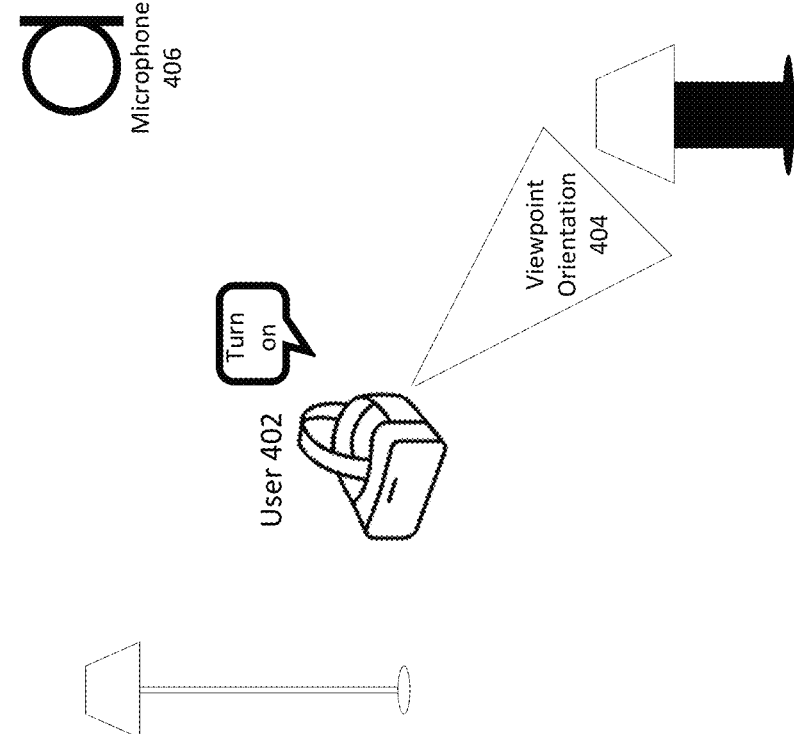
FIG. 4 illustrates an example of a user in a physical environment.
Figure 5:
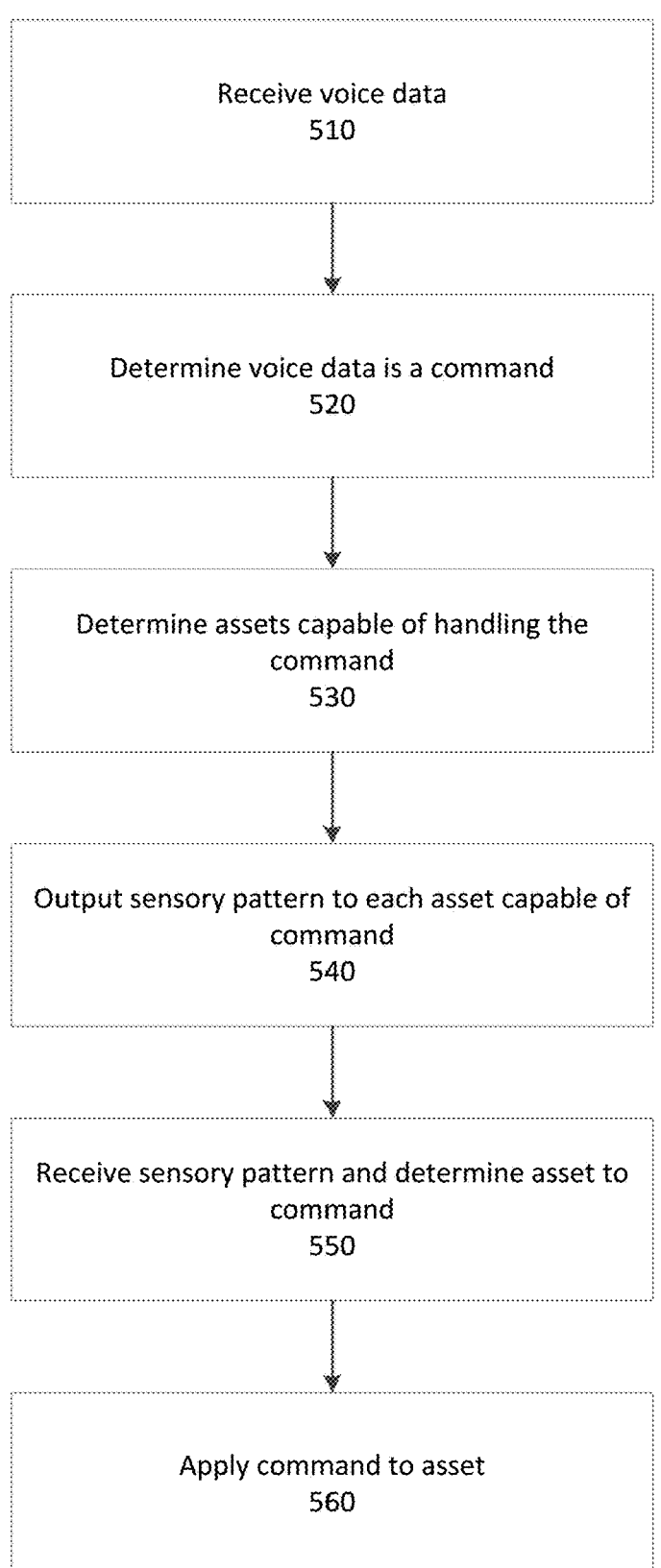
FIG. 5 is a flow diagram depicting an example process for recognizing and responding to vocal commands in a physical environment.

FIG. 5 is a flow diagram depicting an example process for recognizing and responding to vocal commands to an intended asset in a physical environment, such as the physical environment 400, or other environment lacking position data. It is assumed that each asset to be commanded is communicatively connected to a system such that the system may issue commands. For example, the three lamps of FIG. 4 may be assumed to be connected to a smart switch or smart hub connected to a system, such as the computing device 180 of FIG. 1B, so that they may be controlled remotely.

At block 510, an utterance or other voice data may be received. When one or more microphones detect an utterance from the user, the microphones may capture the utterance and send the utterance to a system, such as that of any or all of the devices of FIGS. 1A-B, to process the utterance. A strength and direction of the utterance may also be determined. Such a process may follow that of block 310 of FIG. 3A.

At block 520, the utterance or other voice data may be determined to be a command. After receiving an utterance from a communicatively connected microphone, the system may determine whether the utterance is a command for an asset in the physical environment using any feasible means, such as speech recognition software or other speech analysis process. For example, the system may comprise a dictionary of key words and/or phrases corresponding to commands, as described above at block 320 of FIG. 3A. In such a dictionary, the words "lights off," may correspond to lights being turned off.

At block 530, assets capable of handling the command may be determined. The system may determine, based on the connected assets, which assets, or subset of assets, of the connected assets are capable of following, executing, implementing, delegating, etc., the command. Such a determination may be performed like those described above at block 350 of FIG. 3A. For example, if the white lamp and black lamp are both turned on in the physical environment 400 of FIG. 4, the system may determine that a "turn off" command may apply only to the white lamp and black lamp because the short lamp is not currently turned on.

At block 540, a sensory pattern may be output to each asset capable of the command. A sensory pattern may be a visual, auditory, or other type of pattern that may be recognized by a device such as a virtual reality or augmented reality headset. The system may output a sensory pattern to each possible asset intended to be commanded by the user. The type of sensory pattern may depend on the type of asset. For example, lamps emit light, so a pattern of light may be used. In another example, a specific tone or pattern of noise may be used to identify a speaker or microphone. Yet another example sensory pattern may be an image displayed on a monitor or TV. Each sensory pattern should be unique in time and/or implementation to identify the asset the user is currently viewing and intending to command. For example, the system may flash the light of a lamp in a certain pattern. Such a pattern may be different from that of patterns used for other lamps and/or should occur at a different time than other lamps so that each lamp is uniquely identifiable by its pattern or timing. Sensory patterns may be performed quickly and unobtrusively so as to not distract the user. Devices may perform their specific sensory patterns in an instant, or very quickly, so as to avoid lag between issuance of the command and performance of the command. For example, each lamp in a room may flash in fractions of a second, which may be imperceptible to a user but able to be captured by the user device.

A respective sensory pattern may be generated for each available asset. A sensory pattern may be associated with its respective asset and stored. More than one sensory pattern may be generated per asset, as long as that sensory pattern is unique when displayed to a user. For example, a TV may have an associated visual sensory pattern and an associated audio sensory pattern. Either or both sensory patterns may be used depending on the circumstance. For example, in the above lamp example, it may be more beneficial to use an audio sensory pattern of the TV so that light from the TV does not interfere with light of the lamps.

Each asset may comprise a unique identifier that no other asset of the system may have. A sensory pattern may be associated with the unique identifier of its respective asset and stored in computer storage, such as a database or other suitable relational storage. When a system determines assets capable of handling a received command, the system may look up each asset by its unique identifier in the computer storage. When a system looks up a device's unique identifier in the computer storage, the system may be able to determine the device's associated sensory pattern(s). After determining available sensory patterns, the system may determine which sensory patterns to use, if there is more than one sensory pattern per device, based on the devices the system will output sensory patterns to. For example, determining to use audio sensory patterns instead of visual sensory patterns when most of the other devices will be using visual sensory patterns.

At block 550, a sensory pattern may be received, and the asset to command may be determined. A user device, such as the headset 170f, may capture a sensory pattern and transmit this pattern to the system, e.g., to the input controller 182. For example, the system may be sent data from a camera of the user device to detect one or more output sensory patterns in the data. Based on the sensory pattern, the system may determine an asset the user is attempting to command. If more than one pattern is received, one having the highest intensity or more central focus point may be selected.

For example, using the lamps of FIG. 4, the short lamp may have output two flashes, the black lamp may have output three flashes, and the white lamp may have output four flashes. The user device may capture the two flashes and send such an indication to the system. The system is aware which asset output two flashes (the short lamp) and so determines that asset to be the one the user intends to command. The three flashes and four flashes may have been captured in the periphery of a camera of the user device, while the two flashes was centered; therefore, the system may determine to command the centered lamp instead of the peripheral lamps. The two flashes may have occurred closer to the user, and therefore brighter, than the flashes of the other lamps; therefore, the system may determine to command the brighter lamp instead of the lamps with less intensity.

Sensory patterns for assets that emanate light may comprise turning on a light, turning off a light, and displaying a sequence of blinks, flashes, or any other feasible series of light, such as for example Morse Code. Other sensory patterns for light may comprise changing brightness of light and changing color of light. Assets comprising more than one light may have associated sensory patterns that turn on or turn off specific lights, e.g., string lights may have certain bulbs turned on or off. The light, or series/changes of light, may be captured by the user device and compared to the used sensory patterns. Recognized sensory patterns may be looked up in computer storage to determine which devices the sensory patterns correspond to. If more than one sensory pattern is recognized, then secondary considerations such as closest, brightest, most centered, etc., may be used to choose one asset instead of another asset.

Sensory patterns for assets that emanate sound may comprise playing a unique tone. For example, different speakers in a room may each play a different tone. A speaker may be identified by the clearest or loudest tone received at the user device. Other sensory patterns may comprise a series of tones. The tone, or series/changes of tone, may be captured by the user device and compared to the used sensory patterns. Recognized sensory patterns may be looked up in computer storage to determine which devices the sensory patterns correspond to. If more than one sensory pattern is recognized, then secondary considerations such as loudest, most centered, direction, etc., may be used to choose one asset instead of another asset.

Sensory patterns for assets capable of displaying an image may comprise a displaying a unique image or color on each asset. For example, different monitors in a room may each display a different solid color. Other sensory patterns may comprise a series of images/colors or a portion of video. The image, or series/changes of images, may be captured by the user device and compared to the used sensory patterns. Recognized sensory patterns may be looked up in computer storage to determine which devices the sensory patterns correspond to. If more than one sensory pattern is recognized, then secondary considerations such as closest, brightest, most centered, etc., may be used to choose one asset instead of another asset.

Sensory patterns may also be generated for assets capable of visual and audio interaction. For example, a TV may be assigned a sensory pattern that has both images and audio cues. Such sensory patterns may comprise a combination of the above-described sensory patterns.

Sensory patterns for assets capable of providing haptic feedback may comprise turning on the haptic feedback of each asset. For example, different controllers may be capable of vibrating, and the system may vibrate the controllers. A user may push a button on the correct controller to indicate the correct controller. Other sensory patterns may comprise a series of vibrations or other haptic feedback. A user may press a corresponding button, or the user device may capture the haptic feedback from the user through some other means such as a skin sensor. Recognized button presses or other recognized sensory patterns may be looked up in computer storage to determine which devices the sensory patterns correspond to. If more than one sensory pattern is recognized, then secondary considerations such as closest, most intense, etc., may be used to choose one asset instead of another asset.

At block 560, the command may be applied to the asset. The system may apply the received command to the asset determined from block 550. Depending on latency, the process of FIG. 5 may be performed in a minimal amount of time after the utterance, or even begun during the utterance. For example, if the first word of the utterance is "turn," the system may begin determining assets having available commands using the word "turn." Such anticipation may aid in providing a seamless user experience so that a user will not have to look in the same direction at the asset for an extended period of time.

The process of FIG. 5 may allow a system to determine an intended target asset without extensive mapping of the physical environment or extensive labeling and identification of assets.

Figure 6:
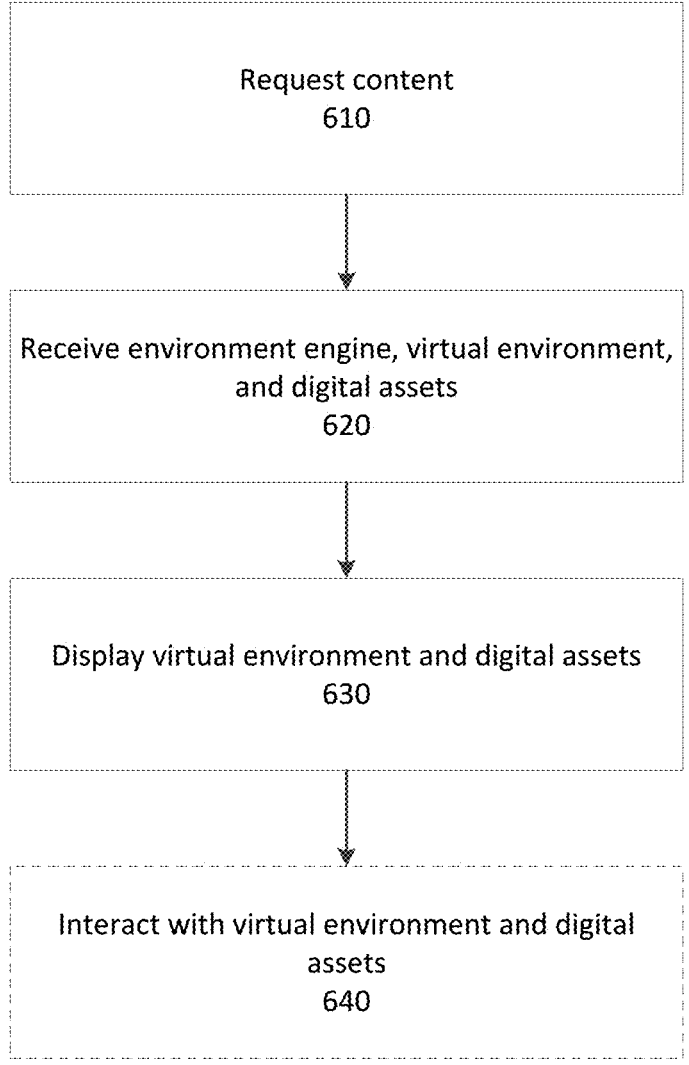
FIG. 6 is a flow diagram depicting an example process for receiving and displaying a virtual environment.

FIG. 6 is a flow diagram depicting an example process for receiving and displaying content with a user device, such as one of the user devices 170.

At block 610, the user device may request content from a content gateway, such as the content gateway 140. Such a request may be of any suitable form and may comprise a request for a content item, such as a virtual environment. For example, a VR headset may request to experience a virtual environment associated with a movie from a communicatively connected set top box or request to experience a virtual environment associated with the user's physical environment. In another example, a smartphone may request to access a virtual environment via a web interface.

At block 620, the user device may receive an environment engine, a virtual environment, and/or digital assets associated with the content item. Before being able to display, or output for display, a virtual environment such as those described herein, the user device may need to download or otherwise receive such parts of the virtual environment. For example, the user device may need to download digital assets and associated coordinates to be able to display the digital assets in the virtual environment for the user.

At block 630, the user device may display, or output for display, the received virtual environment and digital assets. For example, after receiving the environment engine, the virtual environment, the digital assets, a VR headset may populate the virtual environment with the digital assets and place the digital assets at their associated coordinates. The VR headset may then display the virtual environment to the user via an integrated display. Note that the environment engine will not be visible to a user.

At block 640, the user device may optionally interact with the virtual environment and digital assets. After displaying the user interface to a user, the user may interact with the virtual environment and/or digital assets, as described herein. For example, a VR headset may enable a user to view and manipulate digital assets in the virtual environment.

Although FIGS. 3A, 5, and 6 are each depicted as a sequence of blocks, each depicted sequence should not be construed as limiting the scope of the present disclosure. In various cases, aspects, and embodiments, the blocks and described operations may be altered, omitted, reordered, or performed in parallel. For purposes of illustration, reference may be made to the systems described in connection with FIGS. 1A-B and 2, although any suitable network and systems may be used to implement the described processing.

Figure 7:
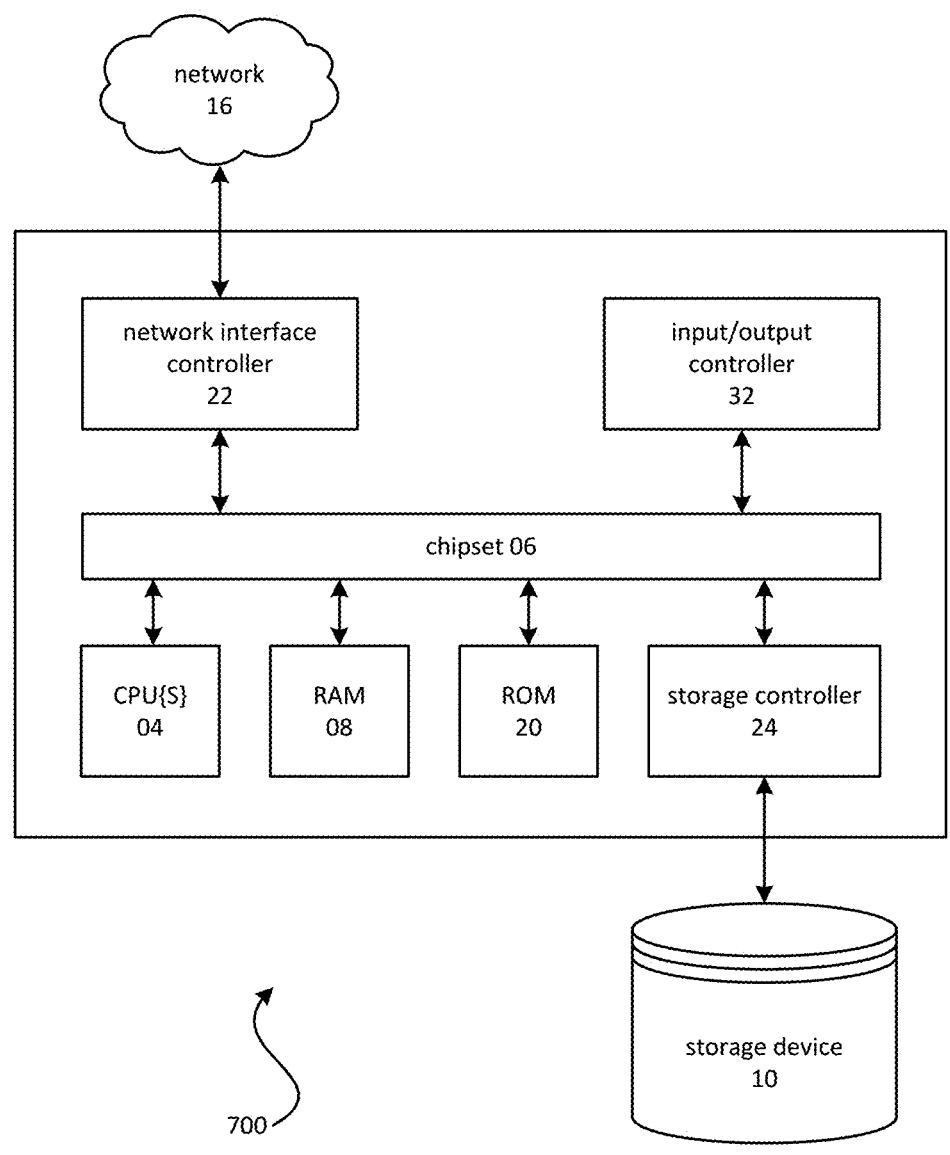
FIG. 7 depicts an example computing system.

FIG. 7 depicts an example computing device in which various components described herein may be embodied, such as any of the various devices and/or components depicted in FIGS. 1A-B and 2. The computing device shown in FIG. 7 may correspond to a set-top box, remote control device, home automation system, desktop computer, laptop, tablet, network appliance, e-reader, smartphone, the content provider 110, the content gateway 140, the user devices 170, the computing device 180, or other computing device, and may be utilized to execute any aspects of the components described herein, such as to implement the operating procedures of FIGS. 3A, 5, and 6 or aid in the creation of any of the environments of FIGS. 2, 3B-C, and 4.

A computing device 700 may include a baseboard, or "motherboard," which is a printed circuit board to which a multitude of components or devices may be connected by way of a system bus or other electrical communication paths. One or more central processing units ("CPUs") 04 may operate in conjunction with a chipset 06. The CPU(s) 04 may be standard programmable processors that perform arithmetic and logical operations necessary for the operation of the computing device 700.

The CPU(s) 04 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 04 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 06 may provide an interface between the CPU(s) 04 and the remainder of the components and devices on the baseboard. The chipset 06 may provide an interface to a random access memory ("RAM") 08 used as the main memory in the computing device 700. The chipset 06 may further provide an interface to a computer-readable storage medium, such as a read-only memory ("ROM") 20 or non-volatile RAM ("NVRAM") (not shown), for storing basic routines that may help to start up the computing device 700 and to transfer information between the various components and devices. The ROM 20 or NVRAM may also store other software components necessary for the operation of the computing device 700 in accordance with the aspects described herein.

The computing device 700 may operate in a networked environment using logical connections to remote computing nodes and computer systems through a local area network ("LAN") 16. The chipset 06 may include functionality for providing network connectivity through a network interface controller (NIC) 22, such as a gigabit Ethernet adapter. The NIC 22 may be capable of connecting the computing device 400 to other computing nodes over the network 16. It should be appreciated that multiple NICs 22 may be present in the computing device 700, connecting the computing device to other types of networks and remote computer systems.

The computing device 700 may be connected to a mass storage device 10 that provides non-volatile storage for the computing device 700. The mass storage device 10 may store system programs, application programs, other program modules, and data, used to implement the processes and systems described in greater detail herein. The mass storage device 10 may be connected to computing device 700 through a storage controller 24 connected to the chipset 06. The mass storage device 10 may consist of one or more physical storage units. A storage controller 24 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 700 may store data on the mass storage device 10 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 10 is characterized as primary or secondary storage and the like.

For example, the computing device 700 may store information to the mass storage device 10 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from the mass storage device 10 by detecting the physical states or characteristics of one or more particular locations within the physical storage units.

In addition to the mass storage device 10 described above, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 10 may store an operating system utilized to control the operation of the computing device 700. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 10 may store other system or application programs and data utilized by the computing device 700.

The mass storage device 10 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 04 transition between states, as described above. The computing device 700 may have access to computer-readable storage media storing computer-executable instructions, which, when executed by the computing device 700, may perform operating procedures depicted in FIGS. 3A, 5, and 6 or aid in the creation of any of the environments of FIGS. 2, 3B-C, and 4.

The computing device 700 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing node may be a physical computing device, such as the computing device 700 of FIG. 7. A computing node may also include a virtual machine host process and one or more virtual machine instances operating on a physical computing device, such as the computing device 700. Computer-executable instructions may be executed by the physical hardware of a computing device indirectly through interpretation and/or execution of instructions stored and executed in the context of a virtual machine.

Methods and systems are described for recognizing and responding to vocal commands to an intended asset in a virtual and/or physical environment. It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the aforementioned detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-executable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

What is claimed:

1. A method comprising:
   receiving voice data associated with a user;
   determining that the voice data comprises a command;
   determining one or more devices capable of handling the command;

outputting a different sensory pattern to each device of the one or more devices;

receiving, from a user device, an indication of a first detected sensory pattern;

determining a first device of the one or more devices that is associated with the first detected sensory pattern; and applying the command to the first device.

2. The method of claim 1, wherein the one or more devices are configured to communicate with a smart hub.

3. The method of claim 1, wherein the determining the one or more devices capable of handling the command comprises determining the one or more devices are each in a state that does not conflict with the command.

4. The method of claim 1, wherein the first detected sensory pattern comprises at least one of: flashes of light, a displayed image, or a tone.

5. The method of claim 1, wherein the first detected sensory pattern is imperceptible to the user.

6. The method of claim 1, wherein each of the different sensory patterns output to the one or more devices is unique in time to each other sensory pattern.

7. The method of claim 1, further comprising:

receiving, from the user device, a second detected sensory pattern, wherein the second detected sensory pattern is associated with a second device of the one or more devices different from the first device;

determining the first detected sensory pattern has a higher intensity than the second detected sensory pattern; and determining, based on the higher intensity, to apply the command to the first device.

8. The method of claim 1, wherein the user device comprises one or more microphones for vocal interaction with the user and at least one of:

a laptop;

a television;

a smartphone;

a tablet;

a desktop;

an augmented reality headset;

a virtual reality headset; or a device capable of presenting content to a user.

9. The method of claim 1, wherein the one or more devices comprise one or more of:

a light;

a lamp;

a television;

a monitor;

a speaker; or an interactive device.

10. A method comprising:

receiving, by a user device, voice data from a user, wherein the voice data comprises a command;

sending, to a computing device, the voice data;

causing, based on the sending the voice data, output of a different sensory pattern to each of one or more devices capable of handling the command;

detecting, by the user device and from a first device of the one or more devices, a first sensory pattern;

sending, by the user device and to the computing device, an indication of the first detected sensory pattern.

11. The method of claim 10, wherein the one or more devices are configured to communicate with a smart hub.

12. The method of claim 10, wherein the one or more devices capable of handling the command are each in a state that does not conflict with the command.

13. The method of claim 10, wherein the first detected sensory pattern comprises at least one of: flashes of light, a displayed image, and a tone.

14. The method of claim 10, wherein the first detected sensory pattern is imperceptible to the user.

15. The method of claim 10, wherein each of the different sensory patterns output to the one or more devices is unique in time to each other sensory pattern.

16. The method of claim 10, further comprising:

detecting, by the user device and from a second device of the one or more devices, a second sensory pattern; and sending, by the user device and to the computing device, an indication of the second detected sensory pattern.

17. The method of claim 10, wherein the user device comprises one or more microphones for vocal interaction with the user and at least one of:

a laptop;

a television;

a smartphone;

a tablet;

a desktop;

an augmented reality headset;

a virtual reality headset; or a device capable of presenting content to a user.

18. The method of claim 10, wherein the one or more devices comprise one or more of:

a light;

a lamp;

a television;

a monitor;

a speaker; or an interactive device.

19. A non-transitory computer-readable medium storing instructions that, when executed, cause:

receiving voice data associated with a user;

determining that the voice data comprises a command;

determining one or more devices capable of handling the command;

outputting a different sensory pattern to each device of the one or more devices;

receiving, from a user device, an indication of a first detected sensory pattern;

determining a first device of the one or more devices that is associated with the first detected sensory pattern; and applying the command to the first device.

20. The non-transitory computer-readable medium of claim 19, wherein the one or more devices are configured to communicate with a smart hub.

21. The non-transitory computer-readable medium of claim 19, wherein the instructions that cause the determining one or more devices capable of handling the command cause determining the one or more devices are each in a state that does not conflict with the command.

22. The non-transitory computer-readable medium of claim 19, wherein the first detected sensory pattern comprises at least one of: flashes of light, a displayed image, and a tone.

23. The non-transitory computer-readable medium of claim 19, wherein the first detected sensory pattern is imperceptible to the user.

24. The non-transitory computer-readable medium of claim 19, wherein each of the different sensory patterns output to the one or more devices is unique in time to each other sensory pattern.

25. The non-transitory computer-readable medium of claim 19, wherein the instructions, when executed, further cause:

receiving, from the user device, a second detected sensory pattern, wherein the second detected sensory pattern is associated with a second device of the one or more devices different from the first device;

determining the first detected sensory pattern has a higher intensity than the second detected sensory pattern; and determining, based on the higher intensity, to apply the command to the first device.

26. The non-transitory computer-readable medium of claim 19, wherein the user device comprises one or more microphones for vocal interaction with the user and at least one of:

a laptop;

a television;

a smartphone;

a tablet;

a desktop;

an augmented reality headset;

a virtual reality headset; or a device capable of presenting content to a user.

27. The non-transitory computer-readable medium of claim 19, wherein the one or more devices comprise one or more of:

a light;

a lamp;

a television;

a monitor;

a speaker; or an interactive device.

28. A system comprising:

a user device;

one or more devices; and a computing device configured to:

receive, from the user device, voice data associated with the user;

determine that the voice data comprises a command;

determine the one or more devices are capable of handling the command;

output a different sensory pattern to each device of the one or more devices;

receive, from the user device, a first detected sensory pattern;

determine a first device of the one or more devices associated with the first detected sensory pattern; and apply the command to the first device.

29. The system of claim 28, wherein the one or more devices are configured to communicate with a smart hub.

30. The system of claim 28, wherein the computing device is configured to determine one or more devices capable of handling the command by determining the one or more devices are each in a state that does not conflict with the command.

31. The system of claim 28, wherein the first detected sensory pattern comprises at least one of: flashes of light, a displayed image, and a tone.

32. The system of claim 28, wherein the first detected sensory pattern is imperceptible to the user.

33. The system of claim 28, wherein each of the different sensory patterns output to the one or more devices is unique in time to each other sensory pattern.

34. The system of claim 28, wherein the computing device is further configured to:

receive, from the user device, a second detected sensory pattern, wherein the second detected sensory pattern is associated with a second device of the one or more devices different from the first device;

determine the first detected sensory pattern has a higher intensity than the second detected sensory pattern; and determine, based on the higher intensity, to apply the command to the first device.

35. The system of claim 28, wherein the user device comprises one or more microphones for vocal interaction with the user and at least one of:

a laptop;

a television;

a smartphone;

a tablet;

a desktop;

an augmented reality headset;

a virtual reality headset; or a device capable of presenting content to a user.

36. The system of claim 28, wherein the one or more devices comprise one or more of:

a light;

a lamp;

a television;

a monitor;

a speaker; or an interactive device.

* * * * *